US012607405B2

(12) United States Patent
Li et al.

(10) Patent No.: US 12,607,405 B2
(45) Date of Patent: Apr. 21, 2026

(54) DRYING APPARATUS AND OVEN

(71) Applicant: CONTEMPORARY AMPEREX TECHNOLOGY (HONG KONG) LIMITED, Hong Kong (CN)

(72) Inventors: Yuting Li, Ningde City (CN); Huan Che, Ningde City (CN); Yalong Qing, Ningde City (CN); Tao Nie, Ningde City (CN); Shisong Li, Ningde City (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 638 days.

(21) Appl. No.: 18/173,747

(22) Filed: Feb. 23, 2023

(65) Prior Publication Data

US 2023/0272975 A1 Aug. 31, 2023

(30) Foreign Application Priority Data

Feb. 25, 2022 (CN) ......................... 202220401766.0

(51) Int. Cl.
*F26B 21/12* (2006.01)
*F26B 21/00* (2006.01)

(52) U.S. Cl.
CPC ............ *F26B 21/12* (2013.01); *F26B 21/004* (2013.01)

(58) Field of Classification Search
CPC ............................... F26B 21/12; F26B 21/004
See application file for complete search history.

(56) References Cited

U.S. PATENT DOCUMENTS 6,182,374 B1 * 2/2001 Yen ......................... F26B 25/06 34/233
2011/0053050 A1 3/2011 Lim et al.
(Continued)

FOREIGN PATENT DOCUMENTS

CN 101547858 A 9/2009
CN 103668840 A 3/2014
(Continued)

OTHER PUBLICATIONS

The extended European search report received in the corresponding European Application 23158512.6, mailed Jul. 27, 2023.
(Continued)

*Primary Examiner* — David J Laux
(74) *Attorney, Agent, or Firm* — K&L Gates LLP

(57) ABSTRACT

A drying apparatus and an oven are provided. In some embodiments, the drying apparatus is used for drying a material. The drying apparatus includes: a blowing mechanism having an air-outlet channel for conveying dry gas to the material; and a guide member movably arranged in the air-outlet channel and used for dividing the air-outlet channel into a first sub-air-outlet channel and a second sub-air-outlet channel, and a first air outlet of the first sub-air-outlet channel and a second air outlet of the second sub-air-outlet channel both facing the material. In the above way, the drying apparatus provided in the present application is capable of realizing adjustment of an air speed without changing an air volume, thereby ensuring the drying efficiency.

12 Claims, 8 Drawing Sheets

(56) References Cited

U.S. PATENT DOCUMENTS

| | | | | |
|---|---|---|---|---|
| 2016/0256794 | A1* | 9/2016 | Schønfeldt | B01D 1/18 |
| 2018/0030701 | A1* | 2/2018 | Bayley | A47K 10/48 |
| 2022/0059845 | A1 | 2/2022 | Kaai et al. | |

FOREIGN PATENT DOCUMENTS

| | | | |
|---|---|---|---|
| CN | 208108724 | U | 11/2018 |
| CN | 210242218 | U | 4/2020 |
| CN | 111219956 | A | 6/2020 |
| CN | 211660405 | U | 10/2020 |
| CN | 212157928 | U * | 12/2020 |
| CN | 113227180 | A | 8/2021 |
| JP | 2015210931 | A | 11/2015 |
| WO | 2020218049 | A1 | 10/2020 |

OTHER PUBLICATIONS

International Search Report and Written Opinion received in PCT Application PCT/CN2021/114544 on May 10, 2022.

* cited by examiner

DRYING APPARATUS AND OVEN

CROSS-REFERENCE TO RELATED APPLICATION

This application claims priority to Chinese Application 202220401766.0, filed on Feb. 25, 2022, and entitled "DRYING APPARATUS AND OVEN", which is incorporated herein by reference in its entirety.

TECHNICAL FIELD

The present application relates to the field of drying technologies, and in particular, to a drying apparatus and an oven.

BACKGROUND ART

An existing drying apparatus blows a material dry by delivering gas to the material. An air outlet on the drying apparatus has a fixed area, and therefore, an air speed or an air volume cannot be adjusted adaptively, resulting in a low drying efficiency.

SUMMARY

In view of the above problems, the present application provides a drying apparatus and an oven, which is capable of realizing adjustment of an air speed without changing an air volume, thereby ensuring the drying efficiency.

According to one aspect of the present application, a drying apparatus is provided for drying a material. The drying apparatus includes: a blowing mechanism having an air-outlet channel for conveying dry gas to the material; a guide member movably arranged in the air-outlet channel and used for dividing the air-outlet channel into a first sub-air-outlet channel and a second sub-air-outlet channel, and a first air outlet of the first sub-air-outlet channel and a second air outlet of the second sub-air-outlet channel both facing the material.

By movably arranging the guide member in the air-outlet channel of the blowing mechanism, the guide member can divide the air-outlet channel into the first sub-air-outlet channel and the second sub-air-outlet channel when moving. The guide member does not change the area of a section of the air-outlet channel, and is only used for dividing the air-outlet channel into two sub-channels, therefore, a total air output of the drying apparatus does not change. Opening areas and internal volumes of the first sub-air-outlet channel and the second sub-air-outlet channel may be changed correspondingly with the movement of the guide member, and therefore, air speeds in the first sub-air-outlet channel and the second sub-air-outlet channel may be changed, thereby realizing adjustment of the air speed without changing the air volume. At the same time, the first airoutlet of the first sub-air-outlet channel and the second air outlet of the second sub-air-outlet channel are both arranged to face the material, so that air flows from the air-outlet channel to the first sub-air-outlet channel and the second sub-air-outlet channel will eventually blow to the material, thereby fully ensuring the drying efficiency of the drying apparatus for the material.

In an optional manner, a rotation shaft is rotationally arranged in the air-outlet channel, and the guide member is fixed on the rotation shaft. When rotating with the rotation shaft, the guide member changes air outputs of the first air outlet and the second air outlet. By rotationally arranging the rotation shaft in the air-outlet channel and fixing the guide member on the rotation shaft, convenient control of the guide member may be achieved by rotating the rotation shaft to adjust opening sizes of the first sub-air-outlet channel and the second sub-air-outlet channel, so that the air outputs of the first air outlet and the second air outlet may change inversely without changing the total air output, and corresponding adjustment may be performed according to actual requirements to achieve the best drying efficiency.

In an optional manner, the blowing mechanism includes a first rotational connecting portion and a second rotational connecting portion arranged oppositely. The guide member is located between the first rotational connecting portion and the second rotational connecting portion, and the rotation shaft is rotationally connected to the first rotational connecting portion and the second rotational connecting portion. By arranging the guide member between the first rotational connecting portion and the second rotational connecting portion, and rotationally connecting the rotation shaft to the first rotational connecting portion and the second rotational connecting portion, the guide member can be smoothly fixed on the blowing mechanism when it rotates to a desired position.

In an optional manner, a surface of the first rotational connecting portion protrudes to form a first arc-shaped protrusion, a surface of the second rotational connecting portion protrudes to form a second arc-shaped protrusion, the first arc-shaped protrusion and the second arc-shaped protrusion are arranged oppositely, and the rotation shaft is rotationally arranged on the first arc-shaped protrusion and the second arc-shaped protrusion respectively. The first arc-shaped protrusion and the second arc-shaped protrusion are arranged on the first rotational connecting portion and the second rotational connecting portion respectively, and the rotation shaft is arranged on the first arc-shaped protrusion and the second arc-shaped protrusion respectively, so that the rotation shaft and the guide member can be conveniently placed on the blowing mechanism or taken off from the blowing mechanism under the support of the first arc-shaped protrusion and the second arc-shaped protrusion, and the rotation shaft and the guide member can rotate smoothly for adjustment.

In an optional manner, the first rotational connecting portion is provided with a first connecting hole, the second rotational connecting portion is provided with a second connecting hole, the first connecting hole and the second connecting hole are arranged oppositely, and the rotation shaft is rotationally arranged in the first connecting hole and the second connecting hole respectively. The first connecting hole and the second connecting hole are arranged on the first rotational connecting portion and the second rotational connecting portion respectively, and the rotation shaft is rotationally arranged in the first connecting hole and the second connecting hole respectively, so that the rotation shaft and the guide member are reliably connected to the blowing mechanism, thereby ensuring the stability of an overall structure of the drying apparatus.

In an optional manner, an outer cover of the second sub-air-outlet channel is provided with an air box, one side of the air box facing the material is provided with an opening, and the air box is used for accommodating the gas blown from the second sub-air-outlet channel, so that the gas is blown to the material from the opening. The air box is arranged on the outer cover of the second sub-air-outlet channel to accommodate the gas blown out of the second sub-air-outlet channel in the air box, and by arranging the opening on the side of the air box facing the material, the gas accommodated in the air box can be smoothly blown to the material through the opening, thereby ensuring the drying efficiency of the drying apparatus for the material.

In an optional manner, the opening is provided with a guide plate, and the guide plate is provided with meshes. By arranging the guide plate at the opening and arranging the mesh on the guide plate, the mesh can provide uniform dispersion and guidance for the gas in the air box. Specifically, the mesh evenly distributes the gas in the air box to different holes and guides the gas to blow to the material, so that the air flow on the material surface is more uniform, which is conducive to ensuring the uniformity of the drying degree of the material surface.

In an optional manner, one end of the rotation shaft is provided with an adjusting member. By arranging the adjusting member at one end of the rotation shaft, it is more convenient to control and adjust the guide member.

According to another aspect of the present application, an oven is provided, which includes the drying apparatus in any of the above methods. There are a plurality of drying apparatuses, and the plurality of drying apparatuses are arranged in a preset direction.

In the oven provided by the present application, by movably arranging the guide member in the air-outlet channel of the blowing mechanism, the guide member can divide the air-outlet channel into the first sub-air-outlet channel and the second sub-air-outlet channel when moving. The guide member does not change the area of a section of the air-outlet channel, and is only used for dividing the air-outlet channel into two sub-channels; therefore, a total air output of the drying apparatus does not change. Opening areas and internal volumes of the first sub-air-outlet channel and the second sub-air-outlet channel may be changed correspondingly with the movement of the guide member, and therefore, air speeds in the first sub-air-outlet channel and the second sub-air-outlet channel may be changed, thereby realizing adjustment of the air speed without changing the air volume. At the same time, the first air outlet of the first sub-air-outlet channel and the second air outlet of the second sub-air-outlet channel are both arranged to face the material, so that air flows from the air-outlet channel to the first sub-air-outlet channel and the second sub-air-outlet channel will eventually blow to the material, thereby fully ensuring the drying efficiency of the oven for the material.

In an optional manner, air boxes are arranged on both sides of the plurality of drying apparatuses in the preset direction, and the air boxes between adjacent drying apparatuses are in communication with each other. By arranging the air boxes on both sides of the plurality of drying apparatuses in the preset direction, and communicating the air boxes between adjacent drying apparatuses, a space occupied by an air box wall in the preset direction is eliminated, space occupation of the oven is effectively reduced, a structural layout of the oven is optimized, and full coverage of blowing in the preset direction is realized, which can fully improve the drying efficiency.

The description above is only a summary of the technical solutions of the present utility model. To make the technical means of the present utility model better understood for implementation according to the content of the specification and to make the above and other objectives, features, and advantages of the present utility model easily understood, specific embodiments of the present utility model will be given below.

DESCRIPTION OF DRAWINGS

Various other advantages and benefits will become apparent to those of ordinary skill in the art upon reading the following detailed description of the preferred embodiments. The drawings are for the purpose of illustrating the preferred embodiments only and are not to be considered a limitation to the present utility model. Also, the same components are denoted by the same reference numerals throughout the drawings. In the drawings.

Figure 1:
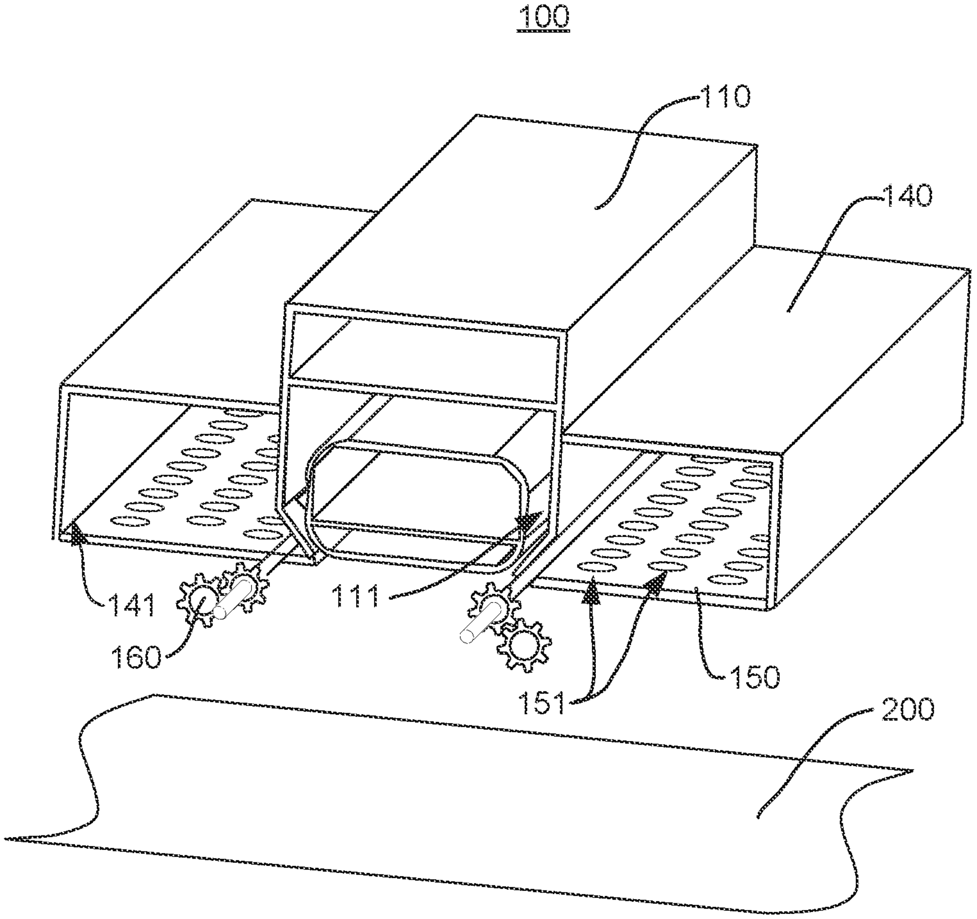
FIG. 1 is a schematic structural diagram of a drying apparatus according to an embodiment of the present application.

Reference numerals in Detailed Description are as follows:

drying apparatus 100, blowing mechanism 110, air-outlet channel 111, first sub-air-outlet channel 1111, first air outlet 1111*a*, second sub-air-outlet channel 1112, second air outlet 1112*a*, first rotational connecting portion 112, first arc-shaped protrusion 1121, first connecting hole 1122, second rotational connecting portion 113, second arc-shaped protrusion 1131, second connecting hole 1132, guide member 120, rotation shaft 130, air box 140, opening 141, guide plate 150, meshes 151, adjusting member 160, oven 10; material 200.

DETAILED DESCRIPTION

Examples of the technical solutions of the present application will be described in detail below in conjunction with the drawings. The following embodiments are only used to more clearly illustrate the technical solution of the present application, and therefore are only used as examples and cannot be used to limit the scope of protection of the present application.

Unless otherwise defined, all technical and scientific terms used herein have the same meaning as commonly understood by those skilled in the art belonging to the technical field of the present application; the terms used herein are intended only for the purpose of describing specific examples and are not intended to limit the present application; the terms "including" and "having" and any variations thereof in the specification and the claims of the present application and in the description of drawings above are intended to cover non-exclusive inclusion.

In the description of the embodiments of the present application, the technical terms "first", "second", and the like are used only to distinguish between different objects, and are not to be understood as indicating or implying a relative importance or implicitly specifying the number, particular order, or primary and secondary relation of the technical features indicated.

Reference herein to "an embodiment" means that a particular feature, structure, or characteristic described in connection with the embodiment can be included in at least one embodiment of the present application. The appearance of this phrase in various places in the specification does not necessarily refer to the same embodiment, nor is it a separate or alternative embodiment that is mutually exclusive with other embodiments. It is explicitly and implicitly understood by those skilled in the art that the embodiments described herein may be combined with other embodiments.

In the description of the embodiments of the present application, the term "and/or" is simply a description of an association of associated objects, which indicates that there may exist three relationships, for example, A and/or B may mean: the presence of A, the presence of both A and B, and the presence of B. In addition, the character "/" herein generally means that the associated objects before and after it are in an "or" relationship.

In the description of the embodiments of the present application, the term "a plurality of" refers to two or more (including two), and similarly, "multiple groups" refers to two or more (including two) groups, and "multiple sheets" refers to two or more (including two) sheets.

In the description of the embodiments of the present application, the orientation or position relationship indicated by the technical terms "center", "longitudinal", "transverse", "length", "width", "thickness", "upper", "lower", "front", "back", "left", "right", "vertical", "horizontal", "top", "bottom", "inner", "outer", "clockwise", "counterclockwise", "axial", "radial", "circumferential" etc. are based on the orientation or position relationship shown in the drawings and are intended to facilitate the description of the embodiments of the present application and simplify the description only, rather than indicating or implying that the device or element referred to must have a particular orientation or be constructed and operated in a particular orientation, and therefore are not to be interpreted as limitations on the embodiments of the present application.

In the description of the embodiments of the present application, unless otherwise expressly specified and limited, the technical terms "mount", "join", "connect", "fix", etc. should be understood in a broad sense, such as, a fixed connection, a detachable connection, or an integral connection; a mechanical connection, or an electrical connection; a direct connection, an indirect connection through an intermediate medium, an internal connection of two elements, or interaction between two elements. For those of ordinary skill in the art, the specific meanings of the above terms in the embodiments of the present application can be understood according to specific situations.

For drying apparatuses that perform drying by blowing air, areas of air outlets on some drying apparatuses are fixed, and the air speed or air volume cannot be adjusted adaptively, so the drying efficiency is low. Some drying apparatuses have wind shields in air flow channels. By moving the wind shield, the area of an air flow channel will be increased or decreased, thereby realizing the adjustment of the air speed and air volume. However, since the air volume will increase with the increase of the air speed and decrease with the decrease of the air speed, it is difficult to be adjusted to an appropriate position, thereby affecting the drying efficiency.

Based on this, a drying apparatus is proposed in the present application. By movably arranging a guide member in an air-outlet channel of a blowing mechanism, the guide member can divide the air-outlet channel into a first sub-air-outlet channel and a second sub-air-outlet channel when moving. The guide member does not change the area of a section of the air-outlet channel, and is only used for dividing the air-outlet channel into two sub-channels; therefore, a total air output of the drying apparatus does not change. Air speeds of the first sub-air-outlet channel and the second sub-air-outlet channel may be changed correspondingly with the movement of the guide member, thereby realizing adjustment of the air speed without changing the air volume, and ensuring the drying efficiency of the drying apparatus for the material.

Figure 2:
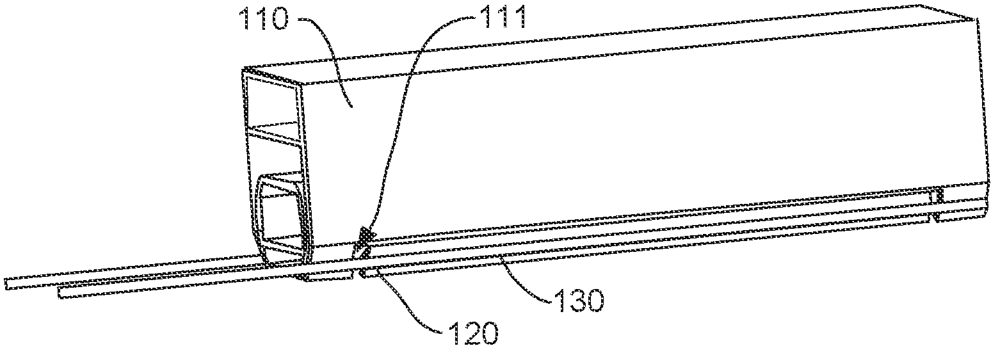
FIG. 2 is a schematic structural diagram of a blowing mechanism and a guide member in a drying apparatus according to an embodiment of the present application.
Figure 3:
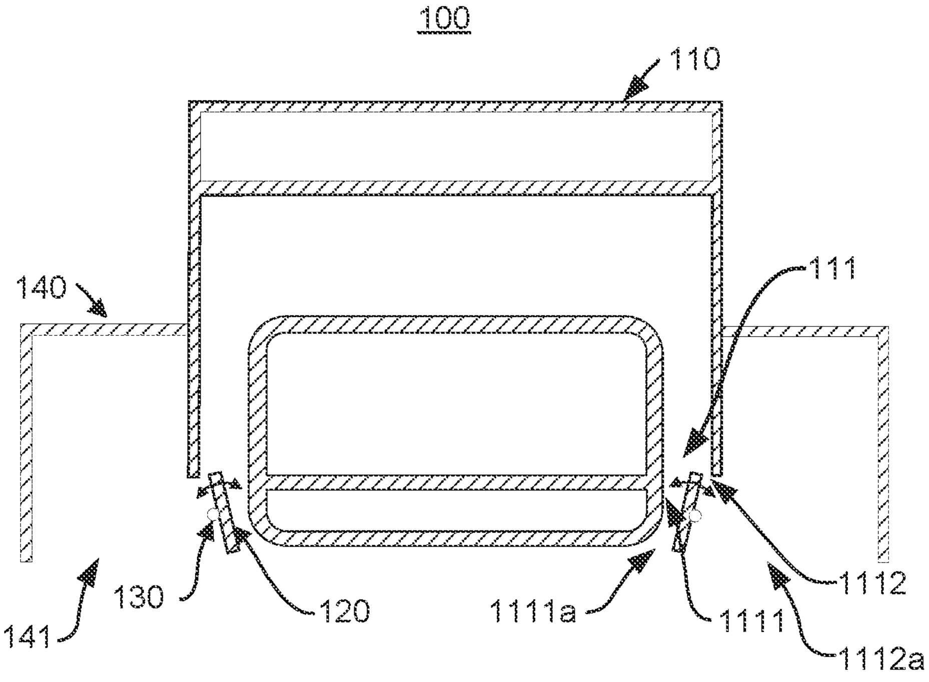
FIG. 3 is a schematic sectional structural diagram of a drying apparatus according to the embodiment of the present application.

According to one aspect of the embodiments of the present application, a drying apparatus for drying a material is provided. Specifically, referring to FIG. 1 to FIG. 3, FIG. 1 shows a three-dimensional structure of drying apparatus 100 according to an embodiment of the present application, FIG. 2 shows a three-dimensional structure of blowing mechanism 110 and guide member 120 in drying apparatus 100 according to an embodiment, and FIG. 3 shows a sectional structure of drying apparatus 100 according to an embodiment. Drying apparatus 100 includes blowing mechanism 110 and guide member 120. The blowing mechanism 110 is provided with air-outlet channel 111, and air-outlet channel 111 is used for delivering dry gas to material 200. Guide member 120 is movably arranged in air-outlet channel 111, and is used for dividing air-outlet channel 111 into first sub-air-outlet channel 1111 and second sub-air-outlet channel 1112. First air outlet 1111*a* of first sub-air-outlet channel 1111 and second air outlet 1112*a* of second sub-air-outlet channel 1112 both face material 200.

It should be noted that, in order to facilitate the display of the internal structure, the specific structure in FIG. 1 and FIG. 2 is a structure shown by drying apparatus 100 after a part is cut off. In a specific product, both sides of blowing mechanism 110 in drying apparatus 100 in FIG. 1 and FIG. 2 with openings in a length direction of guide member 120 are provided with complete side walls to ensure the closure of an internal gas flow channel of blowing mechanism 110.

Material 200 may be an electrode sheet substrate coated with a conductive material as shown in FIG. 1. Specifically, in the field of electrode sheet application batteries, after the conductive material is coated on the electrode sheet substrate, drying apparatus 100 blows air to a substrate material, so that the conductive material is dried and adhered to the electrode sheet substrate to form an electrode sheet. The electrode sheet substrate may be, for example, a current collector. It is understandable that material 200 may also be a coated textile, a plastic structure, or the like.

Blowing mechanism 110 may be an air knife as shown in the figure. The air knife may be driven by a vortex blower or a high-pressure centrifugal blower. After gas is compressed, it may be blown out at a high speed in the form of a thin airflow sheet with a smaller thickness to achieve the drying of material 200.

Guide member 120 may be a plate structure. Guide member 120 may be rotationally arranged in air-outlet channel 111 as shown in FIG. 3, and a rotating direction is a direction shown by an arrow in FIG. 3, so that air-outlet channel 111 may be divided into first sub-air-outlet channel 1111 and second sub-air-outlet channel 1112 by rotating guide member 120.

Figure 4:
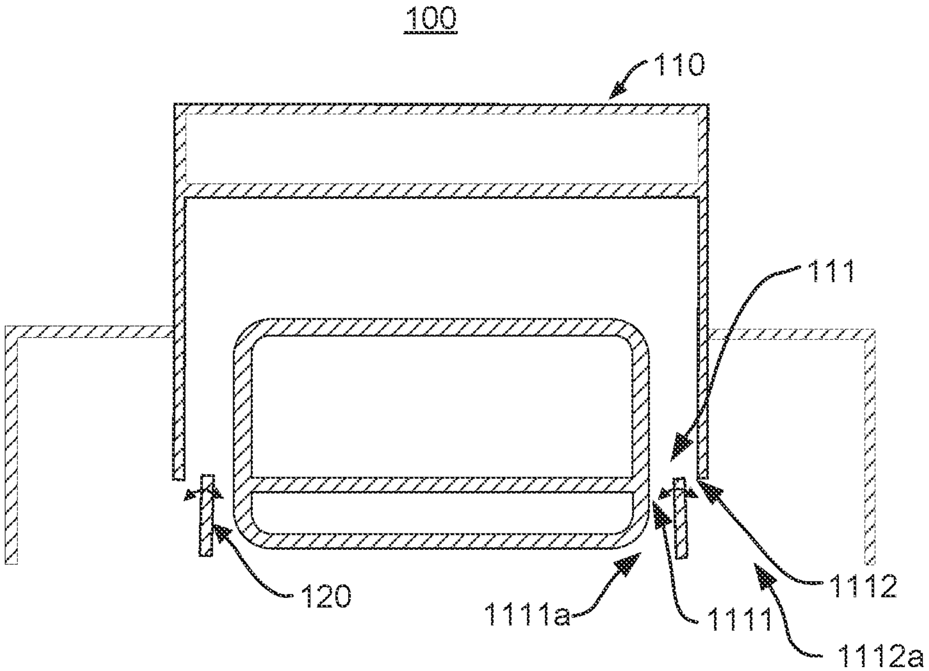
FIG. 4 is a schematic sectional structural diagram of a drying apparatus according to another embodiment of the present application.

As shown in FIG. 4, the figure shows a sectional structure of drying apparatus 100 according to an embodiment of the present application. As shown in the figure, guide member 120 may also be slidably arranged in air-outlet channel 111, and a sliding direction is a direction shown by an arrow in FIG. 4, so that air-outlet channel 111 may be divided into first sub-air-outlet channel 1111 and second sub-air-outlet channel 1112 by sliding guide member 120.

By movably arranging guide member 120 in air-outlet channel 111 of blowing mechanism 110, guide member 120 may divide air-outlet channel 111 into first sub-air-outlet channel 1111 and second sub-air-outlet channel 1112 when moving. Guide member 120 does not change the area of a section of air-outlet channel 111, and is only used for dividing air-outlet channel 111 into two sub-channels; therefore, a total air output of drying apparatus 100 does not change. Opening areas and internal volumes of first sub-air-outlet channel 1111 and second sub-air-outlet channel 1112 may be changed correspondingly with the movement of guide member 120, and therefore, air speeds in first sub-air-outlet channel 1111 and second sub-air-outlet channel 1112 may be changed, thereby realizing adjustment of the air speed without changing the air volume. At the same time, first air outlet 1111*a* of first sub-air-outlet channel 1111 and second air outlet 1112*a* of second sub-air-outlet channel 1112 are both arranged to face material 200, so that air flows from air-outlet channel 111 to first sub-air-outlet channel 1111 and second sub-air-outlet channel 1112 will eventually be blown to material 200, thereby fully ensuring the drying efficiency of drying apparatus 100 for material 200.

Referring to FIG. 2 and FIG. 3 again, in some embodiments of the present application, rotation shaft 130 is rotationally arranged in air-outlet channel 111, guide member 120 is fixed on rotation shaft 130, and when rotating with rotation shaft 130, guide member 120 changes air outputs of first air outlet 1111*a* and second air outlet 1112*a*.

Specifically, guide member 120 may be fixed on an annular side of rotation shaft 130 by welding, and rotation shaft 130 may be arranged on an outer side of guide member 120 as shown in the figure. rotation shaft 130 and blowing mechanism 110 may not be connected, and rotation shaft 130 may be connected to an external supporting structure (such as a supporting hole) after at least one end extending and projecting out of a surface of blowing mechanism 110, thereby realizing fixing of rotation shaft 130 and guide member 120 at a required position.

It may be understood that in some other embodiments, rotation shaft 130 may also be arranged on an inner side of guide member 120, and both ends of rotation shaft 130 are rotationally connected to the side walls of blowing mechanism 110 (that is, side walls not drawn at both ends of blowing mechanism 110 in a length direction of guide member 120 or an axis direction of rotation shaft 130 in FIG. 1 and FIG. 2).

A connecting hole may also be arranged on guide member 120, and rotation shaft 130 is penetrated into the connecting hole and fixedly connected to guide member 120.

By rotationally arranging rotation shaft 130 in air-outlet channel 111 and fixing guide member 120 on rotation shaft 130, convenient control of guide member 120 may be achieved by rotating rotation shaft 130 to adjust opening sizes of first sub-air-outlet channel 1111 and second sub-air-outlet channel 1112, so that the air outputs of first air outlet 1111*a* and second air outlet 1112*a* may change inversely without changing the total air output, and corresponding adjustment may be performed according to actual requirements to achieve the best drying efficiency.

Figure 5:
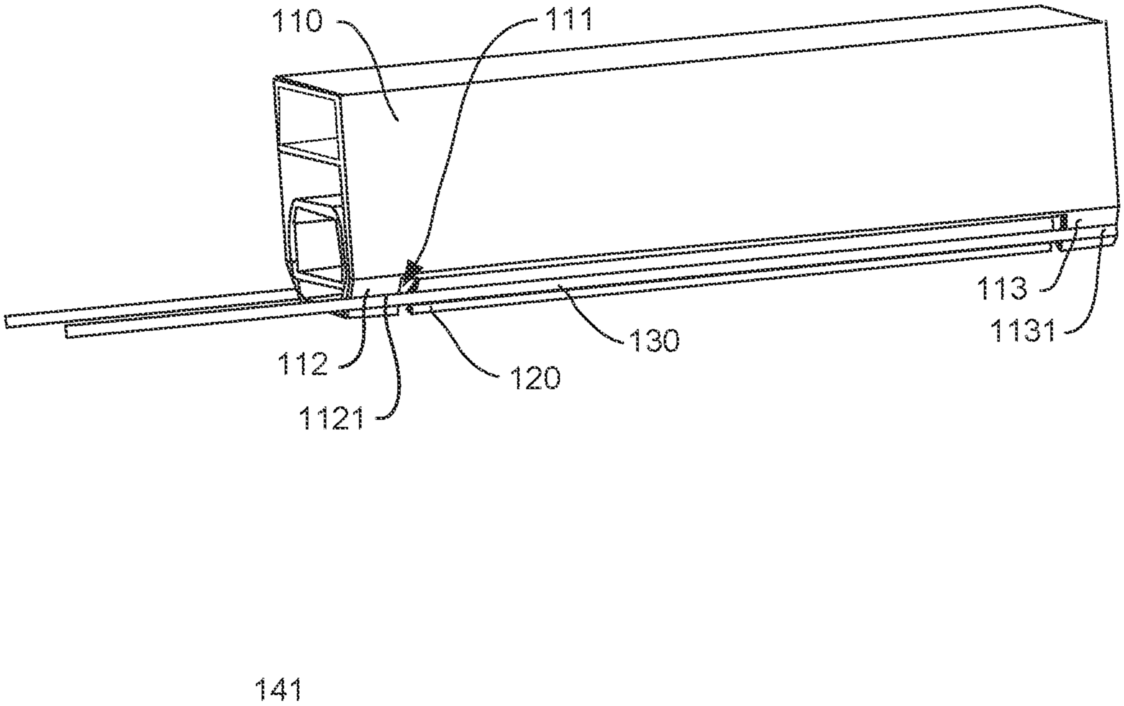
FIG. 5 is a schematic structural diagram of a blowing mechanism and a guide member in a drying apparatus according to another embodiment of the present application.

Referring to FIG. 5, which shows structures of first rotational connecting portion 112 and second rotational connecting portion 113 in drying apparatus 100 according to an embodiment of the present application. In some embodiments of the present application, blowing mechanism 110 includes first rotational connecting portion 112 and second rotational connecting portion 113, guide member 120 is located between first rotational connecting portion 112 and second rotational connecting portion 113, and rotation shaft 130 is rotationally connected to first rotational connecting portion 112 and second rotational connecting portion 113.

As shown in FIG. 5, first rotational connecting portion 112 and second rotational connecting portion 113 are parts on the shell of blowing mechanism 110 located at both ends of guide member 120. First rotational connecting portion 112 and second rotational connecting portion 113 may be provided with structures such as a bearing and a connecting hole, for being rotationally connected to rotation shaft 130.

By arranging guide member 120 between first rotational connecting portion 112 and second rotational connecting portion 113, and rotationally connecting rotation shaft 130 to first rotational connecting portion 112 and second rotational connecting portion 113, guide member 120 can be smoothly fixed on blowing mechanism 110 when it rotates to the desired position.

Still referring to FIG. 5, in some embodiments of the present application, a surface of first rotational connecting portion 112 protrudes to form first arc-shaped protrusion 1121, a surface of second rotational connecting portion 113 protrudes to form second arc-shaped protrusion 1131, first arc-shaped protrusion 1121 and second arc-shaped protrusion 1131 are arranged oppositely, and rotation shaft 130 is rotationally arranged on first arc-shaped protrusion 1121 and second arc-shaped protrusion 1131 respectively.

First arc-shaped protrusion 1121 and second arc-shaped protrusion 1131 are arranged on first rotational connecting portion 112 and second rotational connecting portion 113 respectively, and rotation shaft 130 is arranged on first arc-shaped protrusion 1121 and second arc-shaped protrusion 1131 respectively, so that rotation shaft 130 and guide member 120 can be conveniently placed on blowing mechanism 110 or taken off from blowing mechanism 110 under the support of first arc-shaped protrusion 1121 and second arc-shaped protrusion 1131, and rotation shaft 130 and guide member 120 can rotate smoothly for adjustment.

Figure 6:
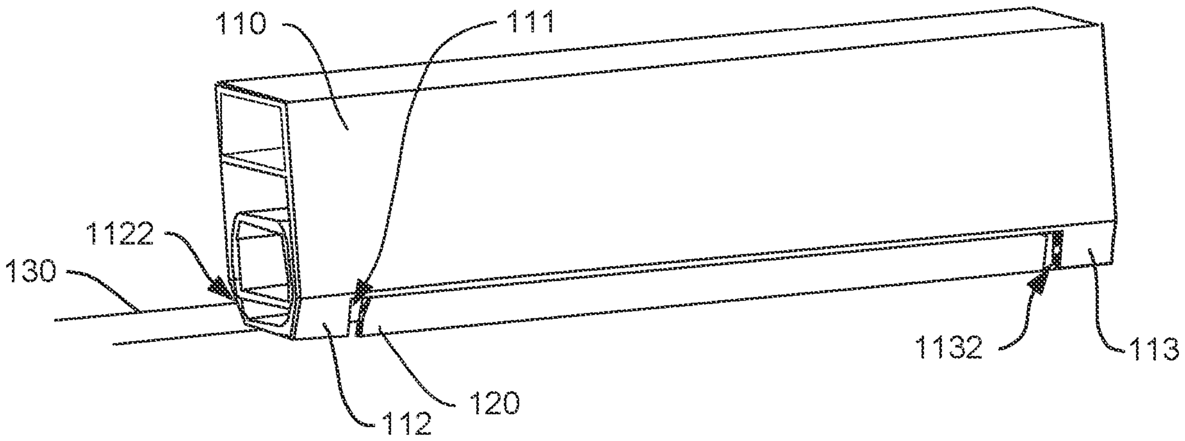
FIG. 6 is a schematic structural diagram of a blowing mechanism and a guide member in a drying apparatus according to still another embodiment of the present application.

Referring to FIG. 6, which shows structures of first connecting hole 1122 and second connecting hole 1132 in drying apparatus 100 according to an embodiment of the present application. In some embodiments of the present application, first rotational connecting portion 112 is provided with first connecting hole 1122, second rotational connecting portion 113 is provided with second connecting hole 1132, first connecting hole 1122 and second connecting hole 1132 are arranged oppositely, and rotation shaft 130 is rotationally arranged in first connecting hole 1122 and second connecting hole 1132 respectively.

First connecting hole 1122 and second connecting hole 1132 may be directly arranged on walls of first rotational connecting portion 112 and second rotational connecting portion 113 as shown in FIG. 6, or protrusions may be arranged oppositely on surfaces of first connecting hole 1122 and second connecting hole 1132, and first rotational connecting portion 112 and second rotational connecting portion 113 are arranged on the two opposite protrusions respectively.

First connecting hole 1122 and second connecting hole 1132 may be both blind holes, or both through holes, or one blind hole and one through hole.

First connecting hole 1122 and second connecting hole 1132 are arranged on first rotational connecting portion 112 and second rotational connecting portion 113 respectively, and rotation shaft 130 is rotationally arranged in first connecting hole 1122 and second connecting hole 1132 respectively, so that rotation shaft 130 and guide member 120 are reliably connected to blowing mechanism 110, thereby ensuring the stability of the overall structure of drying apparatus 100.

Referring to FIG. 3 again, in some embodiments of the present application, an outer cover of second sub-air-outlet channel 1112 is provided with air box 140, one side of air box 140 facing material 200 is provided with an opening 141, and air box 140 is used for accommodating the gas blown from second sub-air-outlet channel 1112, so that the gas is blown to material 200 from opening 141.

Specifically, opening 141 may be formed by hollowing out one side of air box 140 facing material 200 as shown in FIG. 3, or by opening a through hole on a side wall of air box 140 facing material 200.

By installing air box 140 on the outer cover of second sub-air-outlet channel 1112, the gas blown from second sub-air-outlet channel 1112 is accommodated in air box 140, and by arranging opening 141 on the side of air box 140 facing material 200, the gas accommodated in air box 140 may be smoothly blown to material 200 through opening 141, thereby ensuring the drying efficiency of drying apparatus 100 for material 200.

Referring to FIG. 1 again, in some embodiments of the present application, opening 141 is provided with guide plate 150, and guide plate 150 is provided with mesh 151.

As shown in FIG. 1, there may be a plurality of meshes 151 uniformly arranged on guide plate 150. Mesh 151 may be circular, elliptical, square, rhombic, polygonal, or the like, which is not limited here.

By arranging guide plate 150 at opening 141 and arranging mesh 151 on guide plate 150, mesh 151 can provide uniform dispersion and guidance for the gas in air box 140. Specifically, mesh 151 evenly disperses the gas in air box 140 into different holes and guides the gas to blow to material 200, so that the air flow on the surface of material 200 is more uniform, which is conducive to ensuring the uniformity of the drying degree of the surface of material 200.

Still referring to FIG. 1, in some embodiments of the present application, one end of rotation shaft 130 is provided with adjusting member 160.

Specifically, adjusting member 160 may be a knob cover sleeved on rotation shaft 130, and guide member 120 may be adjusted by rotating the knob cover. Adjusting member 160 may also be a motor connected to one end of rotation shaft 130, and the motor drives rotation shaft 130 to rotate to realize the adjustment of guide member 120. On the basis of the above two specific embodiments, adjusting member 160 may also include a gear set, and the knob cover or motor may be connected to rotation shaft 130 through the gear set to achieve acceleration or deceleration, so that the adjustment is more labor-saving or more accurate.

By arranging adjusting member 160 at one end of rotation shaft 130, it is more convenient for controlling and adjusting guide member 120.

According to another aspect of the embodiments of the present application, an oven is provided. Specifically, referring to FIG. 7, it shows a structure of oven 10 according to an embodiment of the present application. As shown in the figure, oven 10 includes drying apparatus 100. There are a plurality of drying apparatuses 100, and the plurality of drying apparatuses 100 are arranged in a preset direction.

Figure 7:
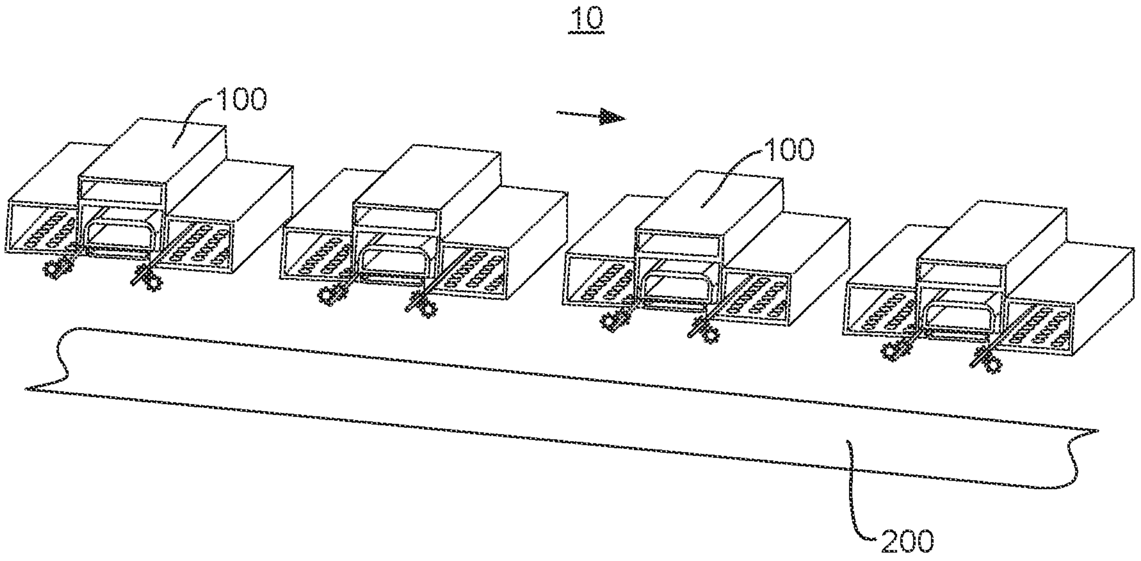
FIG. 7 is a schematic structural diagram of an oven according to an embodiment of the present application.
Figure 8:
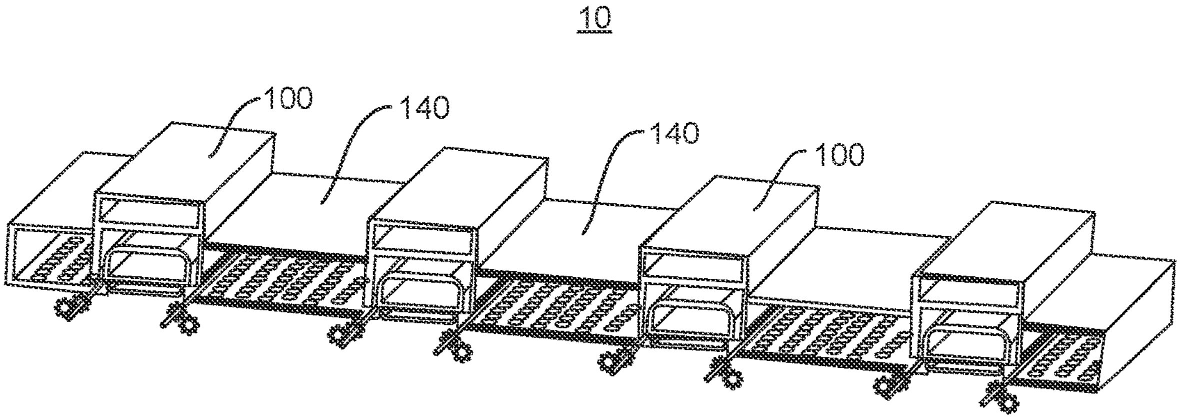
FIG. 8 is a schematic structural diagram of an oven according to another embodiment of the present application.

In the specific embodiment shown in FIG. 7, the preset direction is a direction shown by an arrow in the figure, and when material 200 is an electrode sheet substrate coated with a conductive material, the preset direction may be a delivering direction of feeding and drying the electrode sheet substrate. It should be noted that in other embodiments, the preset direction may be any direction, and a corresponding design may be made specifically according to a product shape or structural characteristics of the material to be dried, which will not be repeated here.

In a production line, the plurality of drying apparatuses 100 may be connected to the same air supply pipeline to reduce space occupation, and optimize the layout of the production line. Moreover, each drying apparatus 100 in oven 10 may be individually adjusted through guide member 120 to achieve the optimal drying effect.

In oven 10 provided in the present application, by movably arranging guide member 120 in air-outlet channel 111 of blowing mechanism 110, guide member 120 may divide air-outlet channel 111 into first sub-air-outlet channel 1111 and second sub-air-outlet channel 1112 when moving. Guide member 120 does not change the area of a section of air-outlet channel 111, and is only used for dividing air-outlet channel 111 into two sub-channels; therefore, a total air output of drying apparatus 100 does not change. Opening areas and internal volumes of first sub-air-outlet channel 1111 and second sub-air-outlet channel 1112 may be changed correspondingly with the movement of guide member 120, and therefore, air speeds in first sub-air-outlet channel 1111 and second sub-air-outlet channel 1112 may be changed, thereby realizing adjustment of the air speed without changing the air volume. At the same time, first air outlet 1111*a* of first sub-air-outlet channel 1111 and second air outlet 1112*a* of second sub-air-outlet channel 1112 are both arranged to face material 200, so that air flows from air-outlet channel 111 to first sub-air-outlet channel 1111 and second sub-air-outlet channel 1112 will eventually be blown to material 200, thereby fully ensuring the drying efficiency of oven 10 for material 200.

Referring to FIG. 10, which shows a structure of an oven according to another embodiment. In some embodiments of the present application, air boxes 140 are arranged on both sides of a plurality of drying apparatuses 100 in a preset direction, and air boxes 140 between adjacent drying apparatuses 100 communicate with each other.

By arranging air boxes 140 on both sides of the plurality of drying apparatuses 100 in the preset direction, and communicating air boxes 140 between adjacent drying apparatuses 100, a space occupied by a wall of air box 140 in the preset direction is eliminated, space occupation of oven 10 is effectively reduced, a structural layout of oven 10 is optimized, and full coverage of blowing in the preset direction is realized, which can fully improve the drying efficiency.

Finally, it should be noted that the above embodiments are merely used for illustrating rather than limiting the technical solutions of the present utility model. Although the present utility model has been described in detail with reference to the above various embodiments, those of ordinary skill in the art should understood that the technical solutions specified in the above various embodiments can still be modified, or some or all of the technical features therein can be equivalently substituted; and such modifications or substitutions do not make the essence of the corresponding technical solutions depart from the scope of the technical solutions of the various embodiments of the present utility model, and shall fall within the scope of the claims of the specification of the present utility model. In particular, the technical features mentioned in the various examples can be combined in any manner as long as there is no structural conflict. The present utility model is not limited to the specific embodiments disclosed herein, but rather includes all technical solutions falling within the scope of the claims.

What is claimed is:

1. A drying apparatus for drying a material, comprising:
a blowing mechanism comprising a first rotational connecting portion and a second rotational connecting portion arranged oppositely and having an air-outlet channel for conveying dry gas to the material, wherein a surface of the first rotational connecting portion protrudes to form a first arc-shaped protrusion, a surface of the second rotational connecting portion protrudes to form a second arc-shaped protrusion, the first arc-shaped protrusion and the second arc-shaped protrusion are arranged oppositely, a rotation shaft is rotationally arranged on the first arc-shaped protrusion and the second arc-shaped protrusion respectively; and
a guide member movably arranged in the air-outlet channel and used for dividing the air-outlet channel into a first sub-air-outlet channel and a second sub-air-outlet channel, a first air outlet of the first sub-air-outlet channel and a second air outlet of the second sub-air-outlet channel both facing the material, wherein the guide member is located between the first rotational connecting portion and the second rotational connecting portion and fixed on the rotation shaft, when rotating with the rotation shaft, the guide member changes air outputs of the first air outlet and the second air outlet.

2. The drying apparatus according to claim 1, wherein an outer cover of the second sub-air-outlet channel is provided with an air box, one side of the air box facing the material is provided with an opening, and the air box is used for accommodating the gas blown from the second sub-air-outlet channel, so that the gas is blown to the material from the opening.

3. The drying apparatus according to claim 2, wherein the opening is provided with a guide plate, and the guide plate is provided with meshes.

4. The drying apparatus according to claim 1, wherein one end of the rotation shaft is provided with an adjusting member.

5. An oven, comprising the drying apparatus according to claim 1, wherein there are a plurality of drying apparatuses, and the plurality of drying apparatuses are arranged in a preset direction.

6. The oven according to claim 5, wherein air boxes are arranged on both sides of the plurality of drying apparatuses in the preset direction, and the air boxes between adjacent drying apparatuses are in communication with each other.

7. A drying apparatus for drying a material, comprising:
a blowing mechanism comprising a first rotational connecting portion and a second rotational connecting portion arranged oppositely and having an air-outlet channel for conveying dry gas to the material, wherein the first rotational connecting portion is provided with a first connecting hole, the second rotational connecting portion is provided with a second connecting hole, the first connecting hole and the second connecting hole are arranged oppositely, and a rotation shaft is rotationally arranged in the first connecting hole and the second connecting hole respectively; and
a guide member movably arranged in the air-outlet channel and used for dividing the air-outlet channel into a first sub-air-outlet channel and a second sub-air-outlet channel, a first air outlet of the first sub-air-outlet channel and a second air outlet of the second sub-air-outlet channel both facing the material, wherein the guide member is located between the first rotational connecting portion and the second rotational connecting portion and fixed on the rotation shaft, when rotating with the rotation shaft, the guide member changes air outputs of the first air outlet and the second air outlet.

8. The drying apparatus according to claim 7, wherein an outer cover of the second sub-air-outlet channel is provided with an air box, one side of the air box facing the material is provided with an opening, and the air box is used for accommodating the gas blown from the second sub-air-outlet channel, so that the gas is blown to the material from the opening.

9. The drying apparatus according to claim 8, wherein the opening is provided with a guide plate, and the guide plate is provided with meshes.

10. The drying apparatus according to claim 7, wherein one end of the rotation shaft is provided with an adjusting member.

11. An oven, comprising the drying apparatus according to claim 7, wherein there are a plurality of drying apparatuses, and the plurality of drying apparatuses are arranged in a preset direction.

12. The oven according to claim 11, wherein air boxes are arranged on both sides of the plurality of drying apparatuses in the preset direction, and the air boxes between adjacent drying apparatuses are in communication with each other.

* * * * *